Sept. 5, 1967  P. M. BRAILLON  3,340,442
ELECTROMAGNETIC PLATES AND CHUCKS
Filed Aug. 11, 1964  2 Sheets-Sheet 1

INVENTOR.
PHILIBERT M. BRAILLON
BY
*Irwin S. Thompson*
ATTY.

Sept. 5, 1967 P. M. BRAILLON 3,340,442
ELECTROMAGNETIC PLATES AND CHUCKS
Filed Aug. 11, 1964 2 Sheets-Sheet 2

INVENTOR.
PHILIBERT M. BRAILLON
BY
ATTY.

ABSTRACT OF THE DISCLOSURE

Electromagnetic plates and chucks are characterized by a series of pole pieces with switching means so that alternate pole pieces can have the same polarity, for concentrating the lines of flux through thin pieces to be held, or so that pairs of adjacent pole pieces can have the same polarity and alternate pairs of the same polarity, so that the flux path is widened for holding thicker articles. The pole pieces can be disposed in straight lines or in circles, and if in circles, preferably a plurality of concentric circles.

---

A metal part which is to be held fast on a magnetic plate or chuck has to lie at least in part in the magnetic field of magnetic poles of opposite polarities so as to serve as a carrier for the magnetic flux and to further thus the passage of the magnetic lines of force between said magnets.

In order that such a part may be properly held on the electromagnetic plate or chuck, it is necessary for the lines of force to be urged into the very heart of the metal forming said part and to be concentrated therein without any leaks.

Now, such conditions are not perfectly satisfied in all cases with the conventional electromagnetic plates and chucks. As a matter of fact, in a plate or chuck having a predetermined polar pitch, the direction and distribution of the lines of force are also well defined and they are normally suitable only for holding fast either parts which have a reduced thickness or else parts having a large thickness. If the polar pitch is small, the lines of force form in fact a tight bunch and can serve only for holding fast thin parts. If, on the contrary, the polar pitch is large, the lines of force expand and allow thus a proper securing of thicker parts. In other words, an electromagnetic plate or chuck is normally suitable only for securing parts, the thickness of which lies within a comparatively narrow range.

My invention eliminates this drawback and it comprises to this end an electromagnetic plate or clutch wherein the spacing between the successive poles of opposite polarities, i.e. the polar pitch may be modified by a mere electric switching so that the lines of force may be more or less tightly bunched together or expanded in accordance with the thickness of the parts to be secured.

The number of values which may be assumed by the polar pitches is irrelevant and may be equal to two, three, four or more, the electric switching providing for the change in pitch being performed for instance by a contact-breaker, either hand-operated or else associated with a push button.

My improved electromagnetic plate or chuck is obviously applicable to all cases, the plates and chucks being provided with electromagnets separated either by parallel rectilinear gaps or by convergent gaps. In the latter case, the electromagnets are arranged along concentric annuli, the inner annulus including a number of separate electromagnets while one or more outer annuli include groups of electromagnets associated with means for modifying the relative polarity of the windings in each of said groups, with a view to modifying the polar pitch of this outer annulus or annuli.

I have illustrated, by way of example, in the accompanying diagrammatic drawings a preferred embodiment of my invention as applied to electromagnetic plates and chucks. In said drawings.

Figure 1:
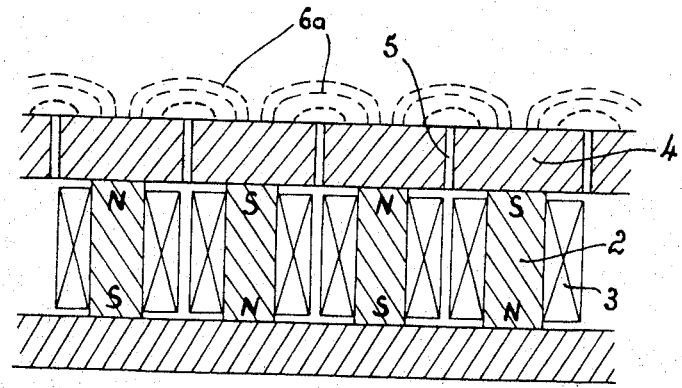
FIGS. 1 and 2 are highly diagrammatic vertical cross-sectional illustrations of a fragment of an electromagnetic plate showing how two polar pitches may be obtained selectively on said plate.
Figure 2:
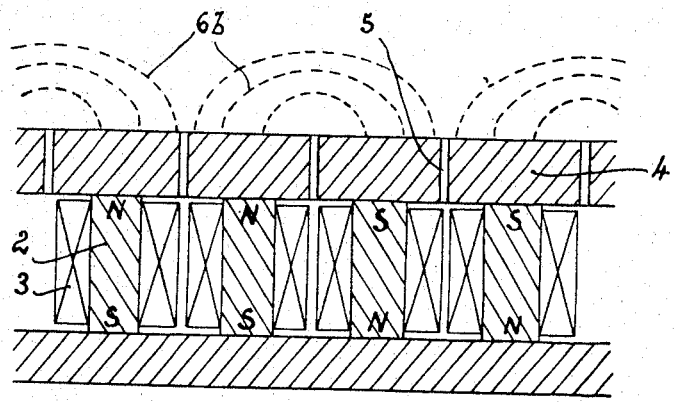

Turning to FIGS. 1 and 2, 2 designates the electromagnetic cores, 3 their windings, 4 the pole pieces in which a metal plate is to be held and 5 the gaps between said pole pieces; N designates the north poles and S designates the south poles of the electromagnetic cores. If two adjacent windings are of opposite polarities, that is if the polarity changes from one core to the next, as illustrated in FIG. 1, the lines of force 6a lie adjacent the pole pieces in tightly bunched relationship, which allows holding efficiently parts having a reduced thickness.

If, in contradistinction, two successive windings have the same polarity and the successive pairs of windings have opposite polarities, as illustrated in FIG. 2, the lines of force 6b expand, which allows efficiently securing parts of a large thickness.

In order to change from one polar pitch value to another, I resort to a manually operated electric switch or to a contact-breaker associated with a box provided with push buttons ensuring respectively the inoperative condition of the device, the condition corresponding to a reduced polar pitch as illustrated in FIG. 1 and the condition corresponding to a large polar pitch, as illustrated in FIG. 2. Obviously, the number of polar pitches may be higher than two.

Figures 3, 4:
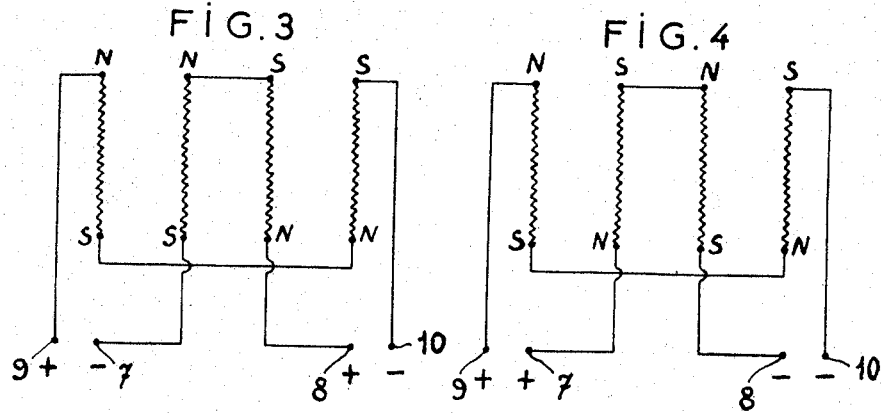
FIGS. 3 and 4 are wiring diagrams showing how the polar pitch may be modified in the elementary case of four windings inserted pairwise in series.

FIGS. 3 and 4 show diagrammatically by way of example the two connections obtained by switching in the case of four windings inserted pairwise in series. The modifications of the polar pitch are obtained by reversing the direction of the current across the two terminals 7 and 8, while no reversal is performed across the terminals 9 and 10.

This manner of modifying the polar pitch may be executed with electromagnetic pole pieces in the form of plates and with chucks having parallel rectilinear gaps and also with chucks having convergent gaps.

In the case of such plates and chucks having parallel rectilinear gaps, it is an easy matter to execute my invention by reason of the symmetry and parallelism between the gaps.

In the case of chucks provided with convergent gaps, it is necessary to go into further detail by reason of the geometrical arrangement formed by said gaps.

An explanation to this end is given hereinafter, reference being made to FIG. 5 which shows, by way of example, a portion of an electromagnetic chuck including two magnetic annuli which allow two different couplings of the windings of the outer annulus.

12 designates the inner annulus including the electromagnets 13 with intermediate gaps 14, 15 designates the outer ring including electromagnets 18 arranged pairwise between the planes extending along successive gaps 14 and separated from each other in each pair by a gap 16. The two annuli 12 and 15 are magnetically insulated from each other by an annular gap 17.

N and S designate respectively the North and South poles of the electromagnetic cores. In the inner annulus 12, the polar pitch is unvarying, while it may be given two different values in the annulus 15. Said two values are provided as shown respectively in the lower part of the right-hand side of FIG. 5 and at the top of the right-hand side of the same figure. The first polar pitch is obviously the larger one, while the second polar pitch has a reduced value.

The two magnetic annuli 12 and 15 are, of course, fed independently and interconnecting means are provided for the outer annulus 15 in the lower section of the chuck. The couplings require, in fact, a feed cable with six leads and a commutator with six rings of which two feed the inner annulus 12 and four the outer annulus 15. The electric control is ensured by a box including at least five pusher knobs serving respectively for the operation of the inner annulus 12, for the deenergization of said annulus, for the operation of the annulus 15 according to a first coupling, for the operation of the outer annulus 15 according to the other coupling and lastly for the deenergization of the outer annulus 15.

Furthermore, demagnetizing means and its control should be provided.

The operation of the chuck is selected in accordance with the size of the part to be secured. If the parts to be secured have a diameter less than that of the outer diameter of the annulus 12, the latter should be fed while the outer annulus 15 need not be fed. In contradistinction, if the parts are provided with a bore larger than the outer diameter of the annulus 12, the latter need not be fed and only the outer annulus 15 should be fed; lastly, if the parts to be held fast have a bore the diameter of which is smaller than the outer diameter of the annulus 12 while their outer diameter is larger than the outer diameter of the latter, both annuli 12 and 15 should be fed.

Figure 5:
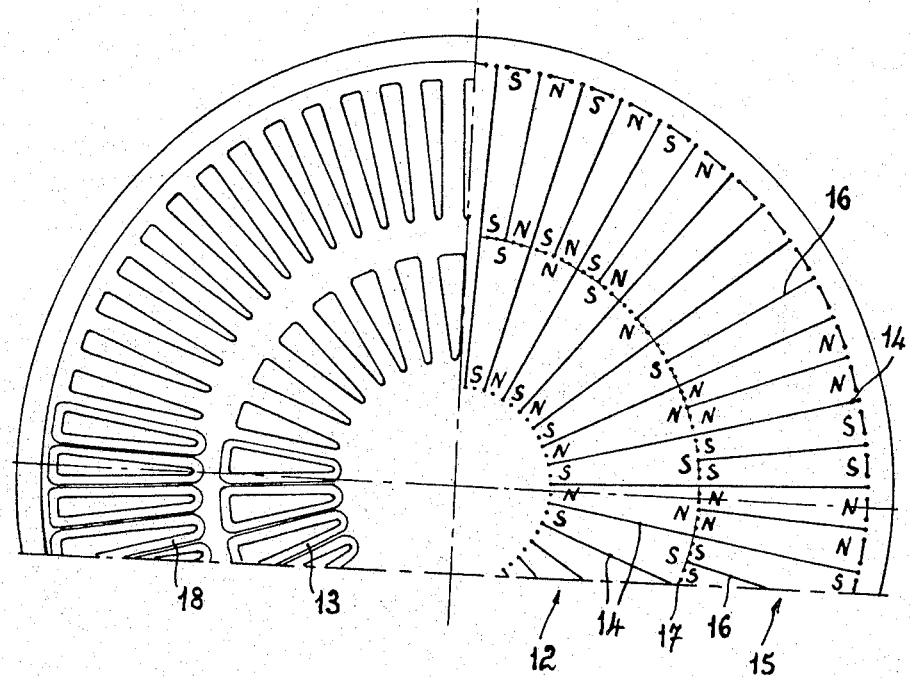
FIG. 5 is a partial plan view of a chuck with convergent gaps showing different pitch combinations.

In the case where the outer annulus 15 is to be energized, its coupling is selected in accordance with the thickness of the part to be secured; if said part is thin, the coupling providing a compact system of lines of force is selected as shown in the upper right-hand side of FIG. 5. If, on the contrary, said part is thick, the coupling producing expanded lines of force is now selected as shown in the lower right-hand side of FIG. 5 where the alternation of the polarities is obtained between successive pairs of electromagnets.

Obviously, the diameter of the chuck is irrelevant and the number both of its magnetic annuli and of the possible polar pitches in said annuli may be selected as desired.

My invention is by no means limited to the embodiments disclosed hereinabove and illustrated in the accompanying drawings and it covers, in contradistinction, all the modifications falling within the scope of the claims.

What I claim is:

1. In electromagnetic plates and chucks, the combination of a plurality of adjacent electromagnetic elements including each a core, a winding surrounding the core, a pole piece carried by each core and subjected to the action of the corresponding winding, said pole pieces being all arranged to one side of the system of electromagnetic elements and disposed in a straight line, means simultaneously feeding electric current into the different windings, and switching means adapted to cooperate with last-mentioned means to shift the direction of flow of the current feeding a number of said windings to thereby make the windings pass between a condition for which the successive windings produce opposed polarities in the corresponding successive cores and a condition for which the successive pairs of windings in said line produce the same polarity in both windings of the pairs, said polarity being reversed between the windings of any one pair and the next pair in said line.

2. In electromagnetic plates and chucks, the combination of an annular series of radially extending electromagnetic elements including each a core, a winding surrounding the core, a pole piece carried by each core and subjected to the action of the corresponding winding, said pole pieces being all arranged to one side of the system of electromagnetic elements and disposed in a circle, means simultaneously feeding electric current into the different windings, and switching means adapted to cooperate with the last-mentioned means to shift the direction of flow of the current feeding a number of said windings to thereby make the windings pass between a condition in which the successive windings produce opposed polarities in the corresponding successive cores and a condition in which the successive pairs of windings in said circle produce the same polarity in both windings of each pair, said polarity being reversed between the windings of any one pair and the next pair in said circle.

3. Apparatus as claimed in claim 2, and a second annular series of radially extending electromagnetic elements including each a core, a winding surrounding the core, a pole piece carried by said core and subjected to the action of the corresponding winding with the pole pieces being all arranged to one side of the system of electromagnetic elements and disposed in a circle that lies entirely within the circle of the first-mentioned electromagnetic elements, with the pole pieces of both series coplanar and with each pole piece of the inner series in registry with a plurality of pole pieces of the outer series and with the pole pieces of the inner series of fixed polarity and successive pole pieces of the inner series of the opposite polarity.

References Cited

UNITED STATES PATENTS 675,323   5/1901   Clark _____ 335—290

MILTON O. HIRSHFIELD, *Primary Examiner.*

LEE T. HIX, *Assistant Examiner.*